April 12, 1949.     G. S. FOSTER ET AL     2,467,023
CENTRIFUGAL DRIER AND PLOW THEREFOR
Filed July 4, 1945     3 Sheets-Sheet 1
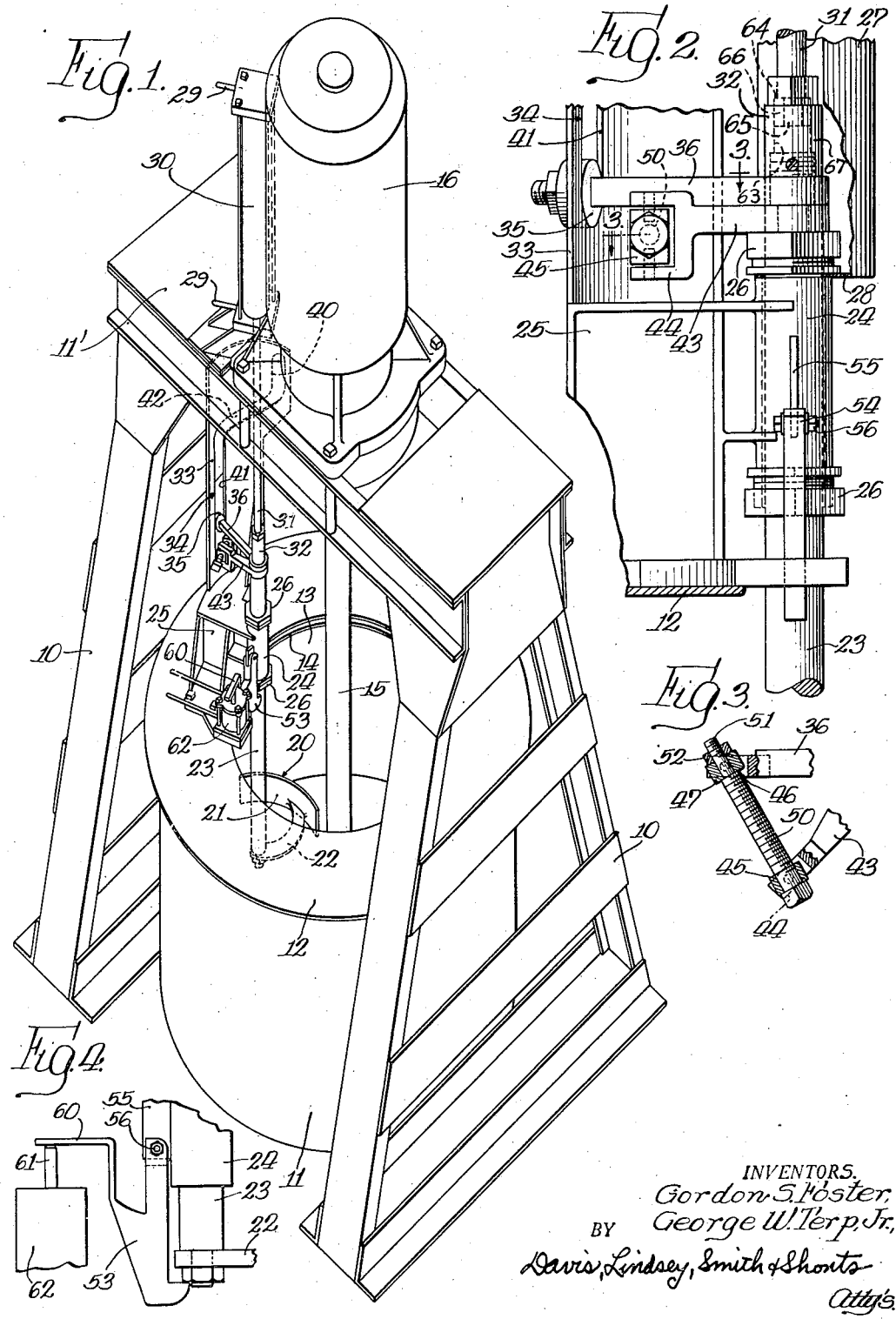
INVENTORS.
Gordon S. Foster,
George W. Terp, Jr.
BY Davis, Lindsey, Smith & Shonts
Attys.

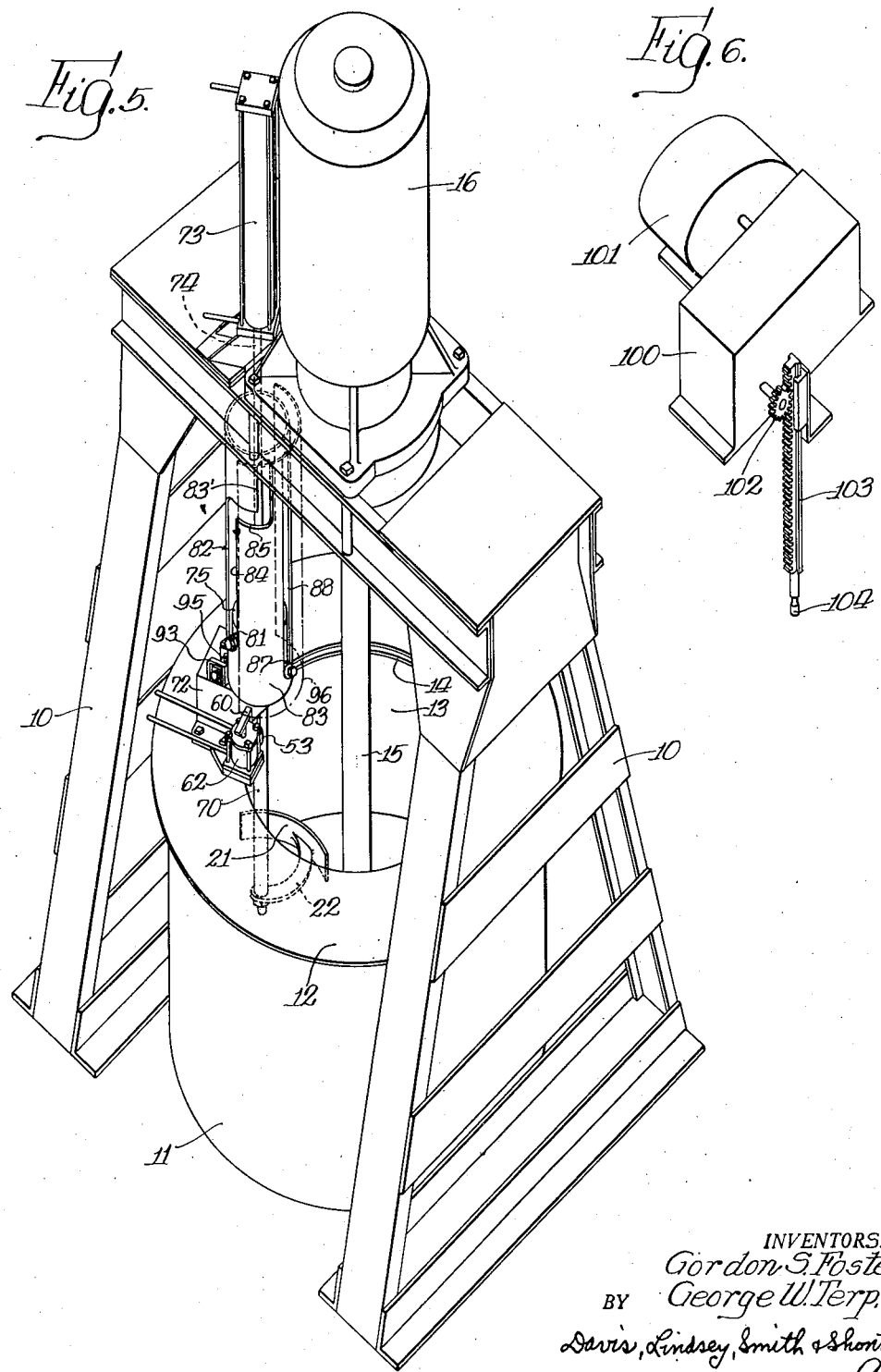

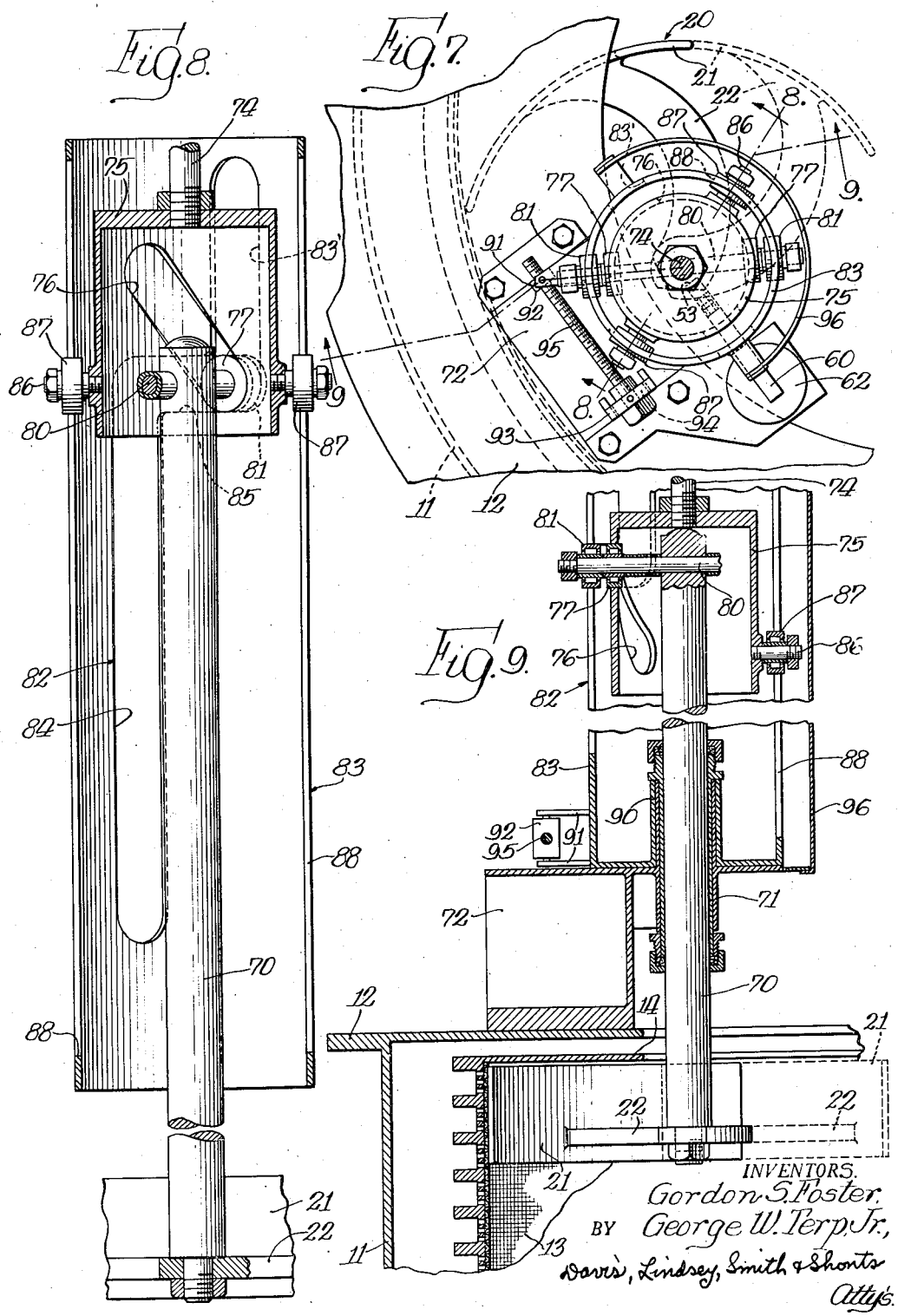

Patented Apr. 12, 1949

2,467,023

UNITED STATES PATENT OFFICE 2,467,023

CENTRIFUGAL DRIER AND PLOW THEREFOR

Gordon S. Foster and George W. Terp, Jr., Chicago, Ill., assignors to Fletcher Works, Inc., Philadelphia, Pa., a corporation of Pennsylvania Application July 4, 1945, Serial No. 603,174

8 Claims. (Cl. 210—70)

The invention relates generally to centrifugal driers and more particularly to unloading mechanism for such a drier.

The general object of the invention is to provide a centrifugal drier having novel mechanism for removing material from the rotary basket of the drier after the material is dried, which mechanism is accurately controlled in its various movements to effect movement of a plow from a point above the basket into the basket to cut away the dried material therein without danger of the plow engaging and damaging the peripheral wall of the basket or any other portion thereof.

Another object is to provide, in a centrifugal drier, novel mechanism for moving a plow, to remove dried material from the basket, from an inactive position above the basket downwardly through the central opening in the upper rim of the basket, then outwardly under the rim, and then downwardly close to the peripheral wall of basket, with the position of the plow accurately controlled at all times to prevent the plow from contacting any part of the basket during its movement.

A further object is to provide, in a centrifugal drier, novel mechanism for moving a material-removing plow through a predetermined path, with the plow adjustable relative to said path so that it may be accurately positioned relative to the basket of the drier.

Still another object is to provide, in a centrifugal drier, novel mechanism for moving a material-removing plow, which may be either pneumatically or mechanically operated, and which causes the plow, in moving outwardly under the rim of the basket, to have a slight downward movement during the outward movement or to have a purely horizontal movement during such part of its path.

A still further object is to provide, in a centrifugal drier, novel mechanism for moving a material-removing plow from a position above the basket downwardly into the basket, with means for locking the plow in its upper position to avoid any chance of it being lowered into the basket when the latter is being filled with material or is being rotated at a centrifugal speed.

Other objects and advantages will become apparent from the following description taken in connection with the accompanying drawings, in which:

Figure 1 is a perspective view of a centrifugal drier embodying the features of the invention;

Fig. 2 is an enlarged fragmentary view showing a portion of the machine;

Fig. 3 is a fragmentary sectional view taken on the line 3—3 of Fig. 2;

Fig. 4 is a fragmentary view showing the means for locking the plow in its inactive position;

Fig. 5 is a view similar to Fig. 1 showing a modified form of the machine;

Fig. 6 is a fragmentary perspective view showing a modified form of drive mechanism;

Fig. 7 is an enlarged fragmentary view of the machine shown in Fig. 5;

Fig. 8 is a sectional view taken on the line 8—8 of Fig. 7;

Fig. 9 is a fragmentary sectional view taken on the line 9—9 of Fig. 7.

Centrifugal driers of the character herein disclosed are utilized in various industries for drying granular material without the use of heat. Thus in the sugar industry the driers are used for discharging water from certain intermediate products. In numerous chemical industries use is found for driers of this character. Also in foundries, molding sand is frequently dried by machines of the character herein disclosed.

A drier of the type herein disclosed comprises generally a frame carrying a cylindrical casing mounted with its axis vertical. Within the casing is a rotatable basket adapted to be driven at high speed to discharge liquid from material placed in the basket, by centrifugal force. The basket is carried on a vertically extending shaft adapted to be driven by power means mounted on the upper part of the frame. In drying various materials, the solids are caused to pack against the periphery of the basket, due to the centrifugal action, and the material has to be cut or sliced away to discharge it from the basket. To this end, the basket is provided with a central opening at its bottom, and a plow is moved into the basket to plow or cut away the material banked against the periphery of the basket. As the material is cut away, it falls through the central aperture in the bottom of the basket.

The plow is usually moved from an inactive position above the basket downwardly into the basket to an active position where the plowing action takes place. Since a basket of this character is ordinarily provided with an inwardly extending rim at its upper rim and the surrounding casing also has such a rim, it is necessary to move the plow downwardly through the central aperture provided by such a rim and then radially outward to effect the plowing action so that the plow will remove all the material which is banked against the peripheral wall of the basket. The plow when moved into position within the basket is held against rotation while the basket rotates slowly, and the plowing action is thereby effected, the plow being fed vertically after it has been moved out to the periphery of the basket to remove all the material for the full depth of the basket.

Heretofore the control of the vertical as well as horizontal movement of the plow has been almost entirely manual, thus requiring the attention of an operator throughout the plowing process. Moreover, with manual control, it is sometimes difficult to properly position the plow so that the maximum amount of material will be removed. Thus the plow must be moved radially outward in the basket to a point just clear of the peripheral wall so that substantially all the material will be removed without permitting the plow to contact the peripheral wall and damage it.

The present invention provides means for guiding and controlling the movements of the plow both during the shifting of the plow from its inactive position to an active position and during the movement of the plow when in the basket and removing material. These movements of the plow are automatically controlled so that the constant attention of an operator is not required. The operator thus may supervise the operation of several machines of this character.

As shown in Fig. 1 of the drawings, the drier is illustrated as comprising a frame having a pair of end uprights 10 and a top bridge member 11' to support all the operating parts of the machine. Mounted between the end uprights 10 is a cylindrical casing 11 having at its upper end an inwardly extending rim 12. Within the casing is located a rotatable basket 13 having perforate peripheral walls and similarly provided with an inwardly extending rim 14 at its upper end. The lower end of the basket 13 is provided with a central opening (not shown) and is connected to a vertically extending drive shaft 15. The shaft 15 extends upwardly through the bridge member 11' and is adapted to be driven by power means such as an electric motor 16 mounted on the bridge member 11'. The wet material is adapted to be fed into the open upper end of the basket, and the basket is adapted to be driven at high speed by the motor 16 to discharge water from the material by centrifugal action. By such action, the material becomes banked against the peripheral wall of the basket and tends to cake in such position after the water is removed.

To remove the material, a plow, indicated at 20, is adapted to be moved into the basket through the open upper end, thence outwardly under the rim 14, and then downwardly throughout the entire length of the basket to plow away the material and permit it to drop through the central opening in the bottom of the basket. The plow is held in its plowing position while the basket is caused to rotate at a relatively slow speed to effect the plowing action. The plow 20 usually comprises an arcuate blade 21 formed on the outer end of an arm 22. The arm 22 is secured to a vertically movable shaft or rod 23 extending upwardly through the opening in the top of the basket and adapted to move the plow in a vertical direction and to swing on its own axis to move the plow radially within the basket below the rim 14.

As heretofore mentioned, the present invention relates particularly to means for controlling the movement of the plow by proper actuation of the plow supporting rod 23. In the preferred embodiment of the invention, the rod 23 is slidably and rotatably supported in a bearing 24 carried by a bracket 25 mounted on and secured to the rim 12 of the casing 11. The bearing 24 is provided at its upper and lower ends with wipers 26 to prevent grit or other dirt from entering the bearing 24 during the movement of the rod 23 therein. Further protection is afforded by a splash guard 27 (see Fig. 2) of arcuate form and having a bottom flange 28 clamped between the upper wiper 26 and the bearing 24.

The plow 20 is adapted to be moved from an inactive position above the basket downwardly into the basket and throughout the length thereof and then reversely through the same path by means which in the present instance comprises an air cylinder 30 mounted on the bridge member 11' adjacent the motor 16. The air cylinder 30 is provided with a piston (not shown) connected to a piston rod 31 joined to the upper end of the plow supporting rod 23. Thus by reciprocation of the piston rod 31, the plow may be given the desired vertical movement. Air under pressure may be supplied to opposite ends of the air cylinder 30 through pipes 29, the supply being controlled by a suitable valve (not shown).

Reciprocation of the piston rod 31 of the air cylinder thus effects vertical movement of the plow. However, such movement must be modified to cause the plow to swing outwardly when it has moved downwardly past the upper rim 14 of the basket so that the plow will swing out to a position adjacent the periphery of the basket and thus in its further movement remove the material banked or caked therein. To this end, means is provided for automatically swinging or rotating the plow supporting rod 23 about its own axis and thus swinging the plow angularly in a direction radially of the basket. To permit such rotative movement of the rod 23, the latter is connected to the piston rod by means of a coupling 32 which supports the rod 23 for vertical movement but permits it to rotate relative to the piston rod 31. The coupling 32 in the present instance comprises a sleeve 67 secured to the upper end of the rod 23. The sleeve 67 has an internal bore 63 which is reduced at its upper end to provide a downwardly facing shoulder 64. The piston rod 31 has a portion 65 of reduced diameter adjacent its lower end and a split ring 66 is mounted on the reduced portion 65. The split ring 66 fits within the bore 63 and engages the shoulder 64 so that the rod 23 may rotate relative to the piston rod 31 but is secured thereto for vertical movement.

Control of the movement of the plow throughout its entire cycle, in the present instance, is exercised by automatic means which utilizes the vertical movement effected by the air cylinder to likewise cause radial or horizontal movement of the plow. In the present instance, such means is in the form of a cam comprising a cam plate 33 extending upwardly from the bracket 25. The cam plate is arcuately shaped and is provided with a cam groove or slot indicated generally at 34. Cooperating with the cam groove 34 is a roller 35 rotatably mounted on the end of an arm 36 movable with the plow supporting rod 23. The cam slot 34 comprises an upper vertical portion 40, a lower vertical portion 41, arcuately spaced from the portion 40 but parallel thereto, and a generally horizontal portion 42 connecting the lower end of the upper portion 40 with the upper end of the lower portion 41.

The roller 35 will follow the various portions of the cam slot 34 and will cause the plow supporting rod 23 to swing at the desired time and will hold it against rotation at other times. Thus the upper portion 40 of the cam slot controls the movement of the plow when moving between its inactive position and a position immediately below the rim 14. The intermediate or generally horizontal portion 42 of the cam slot causes the rod 23 to rotate and thus swing the plow outwardly to a position adjacent the periphery of the basket. The portion 41 of the cam slot guides the movement of the plow when actively plowing material from within the basket and thus holds it closely adjacent the periphery of the basket without permitting it to contact the peripheral wall. The portion 42 of the cam slot, while generally horizontal, is slightly slanted so that the vertical movement effected by the air cylinder 30 will produce the necessary camming action on the roller 35 and cause the arm 36 to swing the plow supporting rod 23.

An operator thus may shift the air valve to supply air to the upper end of the cylinder 30, and the air pressure will thereafter effect the proper movement of the plow downwardly into the basket, then outwardly under the rim by virtue of the cam portion 43 and then downwardly adjacent the periphery of the basket. When the plow reaches the bottom of the basket and all the material has been removed therefrom, the air valve is reversed to supply pressure to the lower end of the cylinder and the plow moves upwardly along the peripheral wall of the basket, until it reaches a position immediately under the rim 14, then inwardly until it may pass the rim 14 and then upwardly to its inactive position. It is thus apparent that the movement of the plow between its upper and extreme lower positions is automatically controlled by the cam plate 33 and the arm 36 carried by the plow supporting rod 23.

One of the features of the invention comprises means for adjusting the plow radially so that it may be readily positioned close to the periphery of the basket without contacting the latter. To this end, the arm 36 is rotatably mounted on the plow rod 23 but is adapted to be rigidly connected thereto by adjustable means so that the position of the plow may be angularly adjusted relative to the arm 36 and the cam slot 34. In the present instance such adjustment is effected by means of a second arm 43 positioned immediately below the first arm 36 and rigidly secured to the plow supporting rod 23 to rotate therewith. The outer end of the second arm 43 is forked as at 44 and carries a pivotally mounted block 45 within the forked end. A similar fork 46 is provided on the lower side of the first arm 36 with a pivotally mounted block 47. Threaded in the block 45 is a screw 50 having a reduced end 51 rotatably mounted in the block 47. The outer portion of the reduced end 51 is threaded and is provided with a nut 52 to hold the block 47 against the shoulder on the screw provided by the reduced end 51. Thus the screw 50 secures the two arms together so that rotation of the plow supporting rod 23 is effected by the swinging movement of the first arm 36 caused by the cam slot 34. By rotating the screw 50, the block 45 may be moved toward or from the block 47, thus adjusting the relative angular positions of the two arms 36 and 43 and thereby adjusting the angular position of the plow 20.

When the basket is being rotated at high speed or when material is being fed into the basket, the plow is held in its upper or inactive position above the basket. In order to insure that the plow will not accidentally be lowered into the basket at such times, locking means is provided to hold it in its upper or inactive position. In the present instance, such locking means comprises a gravity operated hook 53. The upper end of the hook 53 is bifurcated as at 54 to fit over a fin 55 formed on the bearing 24 and is pivotally secured thereto by means of a bolt 56. The weight of the hook 53 is so arranged that gravity tends to swing it inwardly to engage under the lower end of the plow supporting rod 23 as illustrated in Fig. 4. Thus when the plow is moved to its upper position, the hook 53 will swing inwardly to engage thereunder and hold the plow in its inactive position. To release the hook, it is provided with an outwardly extending arm 60 adapted to be engaged by a plunger 61 extending from an air operated cylinder 62. To release the lock, air under pressure is supplied to the lower end of the air cylinder 62 and the plunger 61 is thereby forced upwardly, lifting the arm 60 and swinging the hook 53 outwardly from under the lower end of the plow supporting rod 23.

In operating the machine, after the material has been dried and the high speed rotation of the basket stopped, the operator shifts the air control valve to supply air under pressure to the air cylinder 62 and thus release the lock and to introduce air into the upper end of the air cylinder 30. This causes the plow to move downwardly from its inactive position to a position immediately below the rim 14 of the basket. During such movement, the plow is held against turning or swinging by means of the vertical position of the upper portion 40 of the cam slot 34. After completing this much of the movement, the roller 35, by virtue of the slanting position of the intermediate portion 42 of the cam slot, causes the arm 36 and the rod 23 to swing about the axis of the latter and thus swing the plow radially outward within the basket to a position adjacent the periphery thereof. Such movement is effected automatically or as an incident to the downward movement effected by the air cylinder 30. The roller 35 then enters the lower portion 41 of the cam slot and the plow is carried downwardly within the basket but closely adjacent to the periphery thereof. During this period the plow is actively dislodging the caked material and when so dislodged the material may fall through the opening in the bottom of the basket for removal. When the piston in the air cylinder 30 has reached the lower end of its stroke and the roller 35 has reached the bottom end of the cam slot, the air control valve is reversed and the plow then moves upwardly, following the same path as in its downward movement. When the plow reaches the upper end of its stroke, that is, when it reaches its inactive position above the basket, the air supply is shut off from the cylinder 62. The lock or hook 53 then may fall by gravity to engage under the lower end of the plow supporting rod 23 to positively hold the rod in its upper or inactive position. Thus, it is not necessary to rely upon the maintenance of air pressure in the cylinder 30 to hold the plow in its inactive position.

The adjustment of the angular position of the plow relative to the arm 36, by means of the screw 50, permits the plow to be properly positioned when swung to its outward position adjacent the periphery of the basket. Thus interference of the plow with the peripheral wall of the basket may be definitely prevented.

In the form of the machine shown in Figs. 1 to 4, inclusive, since the intermediate portion 42 of the cam slot 34 has a slight downward slant, the movement of the plow radially outward at the time it reaches the position immediately below the rim 14 may permit some of the material to remain caked within the upper part of the basket immediately under the rim. Depending upon, of course, the character of the material, this may or may not be important. With some materials, the removal of the caked portion below such remainder will cause the latter to loosen by its own weight and lack of support.

In cases where it is desirable to remove such portion by giving the plow a purely horizontal movement when swinging outwardly under the rim of the basket, we have provided the modified form shown in Figs. 5, 7, 8 and 9. In this form the plow is carried on a plow supporting rod 70 which is slidably and rotatably mounted in a bearing 71 formed on a bracket 72 secured on the upper face of the rim of the casing surrounding the basket. Reciprocation of the plow supporting rod 70 is effected by means such as an air cylinder 73 similar to the air cylinder 39. In this instance, however, the connection between the piston rod, indicated at 74, for the air cylinder 73, and the plow supporting rod 70 as well as the cam control means for regulating the movement of the rod 70, are of different construction. The piston rod 74 has rigidly secured to the lower end thereof a cylindrical cam member 75 provided with a pair of diametrically opposite, slanting cam slots 76 in its cylindrical wall. Cooperating with the cam slots 76 are a pair of rollers 77 rotatably mounted on the opposite ends of an arm 80 extending diametrically through and rigid with the upper end of the plow supporting rod 70. Also mounted on the ends of the arm 80 is a pair of rollers 81 cooperating with a cam slot indicated generally at 82 and provided in an outer cylindrical cam member 83 mounted on the upper end of the bearing 71 and resting on the bracket 72. Each of the cam slots 82 comprises an upper vertical portion 83' and a lower vertical portion 84 angularly spaced from the upper vertical portion, the two portions being connected by an intermediate horizontal portion 85. The cam cylinder 75, connected to the lower end of the piston rod 74 of the air cylinder, is provided with a pair of diametrically opposite arms 86 carrying rollers 87 adapted to cooperate with vertical slots 88 provided in the outer cam cylinder 83. The slots 88 are of the same length in vertical height as the cam slots 82 but lack the intermediate horizontal portion thereof. The outer cam cylinder 83 is adapted to be held against rotation during operation of the machine, and the rollers 87 operating in the vertical slots 88 thus hold the inner cylindrical member 75 against rotation but permit vertical movement of the cylindrical member 75 upon acuation of the piston rod 74.

When the plow is in its upper inactive position or is moving downwardly therefrom to a position immediately below the rim of the basket, the rollers 81 are operating in the upper vertical portions 83' of the cam slots 82. The plow supporting rod 70 thus during this part of the motion is held against rotation since the outer cam cylinder 83 is relatively fixed at such time. During such movement, the rollers 77 are positioned in the lower ends of the cam slots 76 in the inner cylindrical member 75, and the upper end of the plow supporting rod 70 is thus spaced from the lower end of the piston rod 74. The rollers 77 are prevented, during such time, from moving upwardly in the cam slots 76 since upward movement would also entail horizontal movement because of the slanting position of the cam slots 76. Such horizontal movement is prevented by the vertical position of the upper portions 83' of the cam slots 82. Therefore, the piston rod 74 and the plow supporting rod 70 move together as a unit with the upper end of the plow supporting rod spaced from the lower end of the piston rod 74.

When the rollers 81 reach the lower end of the vertical portions 83' and are at the entrance or start of the horizontal intermediate portions 85 of the cam slots 82, downward movement of the plow supporting rod 70 is temporarily prevented because of the horizontal position of the intermediate portions 85 and the fact that the rollers 81 are carried by the upper end of the plow supporting rod 70. The rollers 81 at such time can only move horizontally, and such movement is brought about by the slanting cam slots 76 in which the rollers 77 operate. Thus continued downward movement of the piston rod 74 and inner cam member 75 effects rotation of the plow supporting rod 70, the inner cylinder 75 being held against rotation by means of the rollers 87 operating in the vertical slots 88. When the rollers 77 reach the upper end of the cam slots 76, the rollers 81 have moved horizontally into the upper end of the lower portions 84 of the cam slots 82 and are, therefore, free to move vertically to impart such movement to the plow supporting rod 70. The position of the cam slots 76 in the in the inner cylinder 75 is such that while the plow supporting rod 70 is being turned about its axis as just described, the inner cam cylinder 75 moves downwardly a sufficient distance to permit the upper end of the plow supporting rod 70 to abut directly against the lower end of the piston rod 74 as indicated in Fig. 9. The arrangement, therefore, is such as to provide a lost-motion connection between the rods 70 and 74. Further downward movement of the piston rod 74 by its direct abutment with the upper end of the plow supporting rod 70 causes straight downward movement of the plow, and the latter is rigidly held against any rotation by virtue of the straight vertical position of the lower portions 84 of the cam slots 82. Thus when the plowing action is taking place and the greatest load is placed upon the air cylinder to effect the downward movement of the plow, there is a direct abutment between the piston rod 74 and the plow supporting rod 70.

When the plow reaches the bottom end of its stroke, that is, when it reaches the lower end of the basket and all material has been removed therefrom, the air supply to the air cylinder 73 is reversed and the plow moves upwardly, the plow supporting rod 70 remaining in abutment with the piston rod 74 during the upward movement to a point immediately below the rim of the basket. When such point is reached, the horizontal portions 85 of the cam slots 82 cause the plow supporting rod 70 to rotate and the plow to swing inwardly in a horizontal plane to a position where it may clear the rim of the basket. During such inward swinging movement of the plow, the piston rod 74 continues to rise but the plow supporting rod 70 is held against vertical movement. The inner cam member 75 being rigidly connected to the piston rod 74 also moves upwardly during this period and the rollers 77 are thereby moved to the lower ends of the cam slots 76 in the inner cam member 75. The upper end of the plow supporting rod 70 and the piston rod 74 are thereby moved out of abutment and the piston rod thereafter causes vertical movement of the plow supporting rod 70 with the two rods in spaced relation to each other. During the movement of the rollers 81 in the upper portions 83' of the cam slots 82, the plow supporting rod 70 is held against rotation by the vertical position of the portions 83', and the plow upon completion of such movement reaches its upper or inactive position.

To provide for angular adjustment of the plow relative to the basket so that the plow may occupy the desired position relative to the peripheral wall of the basket, the outer cam cylinder 83 is rotatably adjustable relative to the bracket 72. As heretofore mentioned, the outer cam cylinder 83 is mounted on the bearing 71, and is preferably provided with a hub 90 within its lower end, by which the outer cam cylinder 83 is rotatably supported. Extending outwardly from the lower end of the cam cylinder 83 is a pair of arms 91 in which is pivotally supported a block 92. The bracket 72 is also provided with an upwardly extending pivotal support 93 for a similarly pivoted block 94. Rotatably mounted in the block 92 is a screw 95 threaded into the block 94. Thus by rotating the screw 95, the outer cam cylinder 83 may be rotatably adjusted, and since the cam slots 82 in the outer cam cylinder 83 control the angular position of the plow, such adjustment affords a ready means for adjusting the position of the plow relative to the peripheral wall of the basket. The bracket 72 may carry a locking means similar to that shown in Fig. 4 for engaging the lower end of the plow supporting rod 70 to hold it in its inactive position, the release of the locking means being effected preferably by an air cylinder, when the actuating means for the plow supporting rod is in the form of an air cylinder. An arcuately shaped splash guard 96 may be provided to prevent material from splashing on the cam cylinder 83 when the material is being fed into the basket.

In both of the preceding embodiments of the invention, air under pressure is utilized as the source of power. In place of air, if desired, motor operated gearing may be used as illustrated in Fig. 6. Thus in place of an air cylinder, a gear box 100 may be mounted on the upper bridge member of the frame, together with an electric motor 101. Within the gear box 100 is reduction gearing terminating in a pinion 102 meshing with a vertically movable rack 103. The rack 103 is provided with a connecting portion 104 at its lower end, similar in character to the lower end of the piston rod 31 or the piston rod 74. Thus in either of the forms shown in Fig. 1 and Fig. 5, a drive mechanism such as that shown in Fig. 6 may be substituted. In case a drive mechanism of this character is utilized, the locking means for holding the plow in its inactive position is preferably released by a solenoid in place of an air cylinder. Thus in Fig. 1 when a drive mechanism such as shown in Fig. 6 is used, a solenoid is substituted for the air cylinder 62 to release the hook 53.

We claim:

1. In a centrifugal drier having a rotatable basket provided with an inwardly extending rim at its upper end, a plow, a rotatable vertically extending plow-supporting rod, means carried by the drier for reciprocating said rod vertically, and means for causing the plow to clear the rim when moving into and out of the basket, to swing substantially horizontally when immediately below said rim, and when in the basket to move vertically and closely adjacent the periphery of the basket, said last-mentioned means comprising a vertically extending plate carried by the drier and arcuately shaped about the axis of said rod, said plate having a cam track comprising an upper vertical portion, an intermediate generally horizontal but downwardly slanting portion extending from the lower end of said upper portion, and a lower vertical portion extending from the lower end of said intermediate portion, a first arm rotatably mounted on said rod and coacting with said cam track, a second arm rigid with said rod, and adjustable means connecting said arms.

2. In a centrifugal drier having a rotatable basket provided with an inwardly extending rim at its upper end, a plow, a rotatable vertically extending plow-supporting rod, means carried by the drier for reciprocating said rod vertically, and means for causing the plow to clear the rim when moving into and out of the basket, to swing substantially horizontally when immediately below said rim, and when in the basket to move vertically and closely adjacent the periphery of the basket, said last-mentioned means comprising a vertically extending plate carried by the drier and arcuately shaped about the axis of said rod, said plate having a cam track comprising an upper vertical portion, an intermediate generally horizontal but downwardly slanting portion extending from the lower end of said upper portion, and a lower vertical portion extending from the lower end of said intermediate portion, a pair of arms, one rotatably mounted on said rod and coacting with said cam track and the other rigid with said rod, a pair of blocks pivoted on the respective arms, and a screw secured to one of said blocks and threaded into the other to adjust the angular relation between said arms.

3. In a centrifugal drier having a rotatable basket provided with an inwardly extending rim at its upper end, a plow, a rotatable support for said plow, reciprocating means including an actuating member movable vertically and aligned with said support, and means for modifying the movement of said reciprocating means to cause the plow to move vertically clear of said rim, horizontally immediately under said rim and vertically adjacent the periphery of the basket, said last-mentioned means comprising an arcuate cam member having a cam slot comprising upper and lower vertical portions and a horizontal portion connecting the adjacent ends of said vertical portions, an auxiliary arcuate cam member depending from the lower end of said actuating member and having a slanting cam slot, and a cam follower rigidly secured to said support and coacting with said slanting cam slot and with said first named cam slot.

4. In a centrifugal drier having a rotatable basket provided with an inwardly extending rim at its upper end, a plow, a rotatable support for said plow, reciprocating means including an actuating member movable vertically and aligned with said support, and means for modifying the movement of said reciprocating means to cause the plow to move vertically clear of said rim, horizontally immediately under said rim and vertically adjacent the periphery of the basket, said last-mentioned means comprising a main cam member arcuately shaped about the axis of said rod and having a cam track comprising an upper vertical slot, a lower vertical slot, and a horizontal slot connecting the lower end of said upper vertical slot with the upper end of said lower vertical slot, an auxiliary cam member arcuately shaped about the axis of said rod and depending from said actuating member in concentric relationship within said main cam member, said auxiliary cam member being rigidly secured against rotary movement relative to said main cam member and having a slanting cam slot, and a cam follower rigidly secured to said support and coacting with said slanting cam slot and with said first named cam slot, said main cam member being adapted to control vertical movement of the plow and said auxiliary cam member being adapted to effect horizontal movement of said plow.

5. In a centrifugal drier having a rotatable basket provided with an inwardly extending rim at its upper end, a plow, a rotatable support for said plow, reciprocating means including an actuating member movable vertically and aligned with said support, and means for modifying the movement of said reciprocating means to cause the plow to move vertically clear of said rim, horizontally immediately under said rim and vertically adjacent the periphery of the basket, said last-mentioned means comprising a main cam member including a cam slot having parallel upper and lower vertical portions and a horizontal connecting portion, an auxiliary cam member secured to the lower end of said actuating member and having a slanting cam slot, and a cam follower rigidly secured to the upper end of said support and coacting with said slanting cam slot and with said first named cam slot, said cam follower being disposed at the lower end of said slanting cam slot and said auxiliary cam member thereby providing the driving connection between said support and said actuating member when said follower is traversing said upper vertical portion of said first named cam slot, and said cam follower being disposed at the upper end of said slanting cam slot whereby to permit direct engagement of said support and said actuating member when said follower is traversing said lower vertical portion of said first named cam slot.

6. In a centrifugal drier having a rotatable basket provided with an inwardly extending rim at its upper end, a plow, a rotatable support for said plow, reciprocating means including an actuating member movable vertically and aligned with said support, and means for modifying the movement of said reciprocating means to cause the plow to move vertically clear of said rim, horizontally immediately under said rim and vertically adjacent the periphery of the basket, said last-mentioned means comprising a main cam cylinder mounted on the drier coaxially with said actuating member, said cam cylinder having a vertical guide slot and a cam slot comprising an upper vertical portion, an intermediate horizontal portion and a lower vertical portion, an auxiliary cam cylinder within said main cylinder and having a slanting cam slot, the upper end of said support projecting into said auxiliary cam cylinder, an arm projecting from said auxiliary cylinder into said guide slot to hold said auxiliary cylinder against rotation, and an arm projecting from said support through said slanting cam slot and into the cam slot in the main cylinder.

7. In a centrifugal drier having a rotatable basket provided with an inwardly extending rim at its upper end, a plow, a rotatable vertically extending plow supporting rod, means carried by the drier for reciprocating said rod vertically, and means including a cam element carried by the drier and a follower element associated with said rod and coacting with said cam element for causing the plow to clear the rim when moving into and out of the basket, to swing substantially horizontally when immediately below said rim, and when in the basket to move vertically and closely adjacent the periphery of the basket, said cam element comprising an upright cam plate having an arcuately shaped portion and a cam track in said arcuate portion comprising an upper vertical portion, a lower vertical portion parallel to said upper vertical portion, and a transverse intermediate portion connecting the lower end of said upper vertical portion with the upper end of said lower vertical portion, and an adjusting member operably connected with one of said elements and extending generally transversely to a radius from the axis of said rod, said adjusting member being movable longitudinally for angularly adjusting said rod.

8. In a centrifugal drier having a rotatable basket provided with an inwardly extending rim at its upper end, a plow, a rotatable support for said plow, reciprocating means including an actuating member movable vertically and aligned with said support, and means for modifying the movement of said reciprocating means to cause the plow to move vertically clear of said rim, horizontally immediately under said rim and vertically adjacent the periphery of the basket, said last mentioned means comprising a main cam cylinder mounted for rotation on the drier coaxially with said actuating member, said cam cylinder having a vertical guide slot and a cam slot comprising an upper vertical portion, an intermediate horizontal portion and a lower vertical portion, an auxiliary cam cylinder connected to the lower end of said actuating member within said main cylinder and having a slanting cam slot, the upper end of said support projecting into said auxiliary cam cylinder, an arm projecting from said auxiliary cylinder into said guide slot to hold said auxiliary cylinder against rotation, an arm projecting from said support through said slanting cam slot and into the cam slot in the main cylinder, and an adjusting screw rotatably mounted on the drier and operably connected with the exterior of said main cam cylinder for angularly adjusting the position of said cylinder relative to the drier.

GORDON S. FOSTER.
GEORGE W. TERP, Jr.

REFERENCES CITED

The following references are of record in the file of this patent:

UNITED STATES PATENTS

| Number | Name | Date |
|---|---|---|
| 712,583 | Packard et al | Nov. 4, 1902 |
| 1,102,530 | Mackintosh | July 7, 1914 |
| 1,131,675 | Bunker | Mar. 16, 1915 |
| 1,170,001 | Sailer | Feb. 1, 1916 |
| 1,205,128 | Mackintosh | Nov. 14, 1916 |
| 2,076,516 | Roberts | Apr. 6, 1937 |